Dec. 15, 1953  E. H. SOUTER  2,662,429
AUTOMATIC SQUEEZE RIVETER
Filed June 12, 1948  7 Sheets-Sheet 1

Inventor.
Eugene H. Souter.
By Wilkinson Huxley Byron & Hume
Attys.

Dec. 15, 1953          E. H. SOUTER          2,662,429
AUTOMATIC SQUEEZE RIVETER Filed June 12, 1948          7 Sheets-Sheet 5

Inventor.
Eugene H. Souter.

Dec. 15, 1953      E. H. SOUTER      2,662,429
AUTOMATIC SQUEEZE RIVETER Filed June 12, 1948      7 Sheets-Sheet 6

Inventor:
Eugene H. Souter.
By Wilkinson Huxley Byron & Hume
Attys.

Patented Dec. 15, 1953

2,662,429

UNITED STATES PATENT OFFICE 2,662,429

AUTOMATIC SQUEEZE RIVETER

Eugene H. Souter, Evanston, Ill.

Application June 12, 1948, Serial No. 32,669

12 Claims. (Cl. 78—48)

This invention relates to tools of the general character employed in riveting and has reference particularly to a fully automatic pneumatic-hydraulic squeeze riveter which, without requiring manual adjustment, will upset rivets of any size in work of any thickness within the capacity of the riveter, producing heads of extreme precision according to established standards; and with far greater precision with reference to the all-important factors of head height, diameter and concentricity than has thus far been possible by the use of other riveters of this general hand type classification.

One of the important objects of the invention is to provide a portable squeeze riveting machine having a manually manipulatable trigger and power cylinders with coacting mechanism constructed and arranged to accomplish in sequence according to the actuation of the trigger the steps in the cycle of first moving the work engaging plunger into contact with the work, then moving the ram into contact with the rivet with a comparatively light force for size computing purposes, then subjecting the ram to a thrust capable of upsetting the rivet, and thereafter retracting the ram and associated parts, all of said steps taking place upon movement of the trigger through its complete path of travel to and from a normal position.

A more specific object of the invention is to provide a squeeze riveter as above described wherein an auxiliary power cylinder is provided for moving the plunger into contact with the work and for also moving the ram into contact with the rivet for computing the size of the rivet, and wherein a main power cylinder is provided for intensifying the force on the ram for upsetting the rivet, said power cylinder being actuated in sequence but being retracted substantially simultaneously.

A further object of the invention is to provide a portable squeeze riveter of the pneumatic-hydraulic type having means capable of computing the size of the rivet by gauging its length and which will then function in coaction with other mechanism to upset the rivet, leaving an upset head of a height substantially proportional to the diameter of the rivet.

A further object of the invention is to provide a pneumatic-hydraulic riveter having improved compensating means within the hydraulic compartment and which is collapsed to expel air from the same upon an increase in the hydraulic pressure within the compartment and is automatically inflated to original size again by air pressure when the hydraulic pressure returns to normal.

Another object of the invention is to provide a riveter of the character described wherein the plunger is moved into contact with the work and the ram is moved into contact with the rivet for rivet-size computing purposes by a movable carriage which is hydraulically locked in rivet-size computing position.

A more specific object of the invention is to provide a riveter having a movable carriage as described and which is reciprocated by the auxiliary power cylinder with novel hydraulic lock means being interposed between the carriage and cylinder, permitting movement of the carriage in either direction by actuation of the power cylinder but with automatic locking taking place at the end of the forward travel of the carriage preventing rearward movement as a result of the substantial incompressibility of a fluid medium trapped by said lock means.

In portable riveters as heretofore constructed exceedingly tedious time-consuming adjusting operations have been required in changing from driving rivets of one size to driving rivets of a different size, or in riveting together one thickness of grip and then changing to another thickness. The necessity for such adjustments occurs frequently due to the wide range of rivet sizes and thickness of grip often employed, particularly in the fabrication of structural assemblies to which the present riveter is expressly adapted.

In the device of the invention all adjusting operations are eliminated by the automatic grip-variation compensating means in combination with the automaic rivet-size computing structure and additional time is also saved by eliminating the practice of manually pressing the plates together with clamps and the like which is also done automatically by the work engaging plunger in initially contacting the sheets or plates with sufficient force to press them together prior to riveting.

In connection with the rivet size computing mechanism of the present riveter the invention provides a unit assembly including a movable carriage wherein said mechanism is combined with and has joint operation with force multiplying means in the form of a toggle device. The thrust from the auxiliary power cylinder, to move the plunger into contact with the work and to move the ram into contact with the rivet, takes place through the carriage which provides the rear pivot connection for the toggle device.

Therefore another object of the invention is to provide a riveter having a unit assembly, as described, incorporating rivet size computing mechanism of novel design and operation and also incorporating said force multiplying toggle device for applying the force to upset the rivet following the computing operation, the parts being designed and constructed to provide for predetermined total deflection resulting from the elastic change in the parts due to the tremendous force required in forming the upset head on the rivet.

A further object of the invention is to provide a riveter incorporating a movable plunger comprising a work closer which initially contacts the work to close the sheets or plates to be riveted and in addition functions as aligning means for automatically aligning the ram with the rivet, thereby preventing clinched rivets and eccentric heads.

Another object of the invention is to provide a riveter incorporating a movable plunger comprising a work closer which additionally functions as grip-variation adjusting means since the plunger initially contacts the work, thus immobilizing and positioning the plunger and accordingly this action provides a reference position from which subsequent movement of the rivet upsetting ram and the force multiplying toggle device are measured in the presetting operation to compute rivet size whereby the action of the plunger adjusts for variation in thickness of the work.

A further object of the invention is to provide a riveter of the character described wherein the trigger is located in a confined position for maximum safety purposes, thus preventing accidental tripping of the trigger. In this connection, another feature of the plunger resides in the fact that even if the trigger is unintentionally actuated the said plunger is applied with relatively low pressure, thus preventing serious damage since the high pressure ram never projects beyond the plunger.

A further object of the invention is to provide a riveter as described which will be fully automatic in operation, requiring only that the operator straddle the rivet and actuate the trigger. Regardless of the size of the rivet or thickness of the grip, within the capacity range of the riveter, the sheets or plates to be riveted are first closed and then the rivet is upset the correct amount, leaving a concentric head of specified height and diameter. The present riveter employs a relatively small number of parts all of which are combined in a tool of simple but durable construction, and a tool capable of vastly greater speed in performing squeeze riveting operations with the maximum degree of precision and uniformity to insure minimum production costs and the highest possible standard of workmanship.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1:
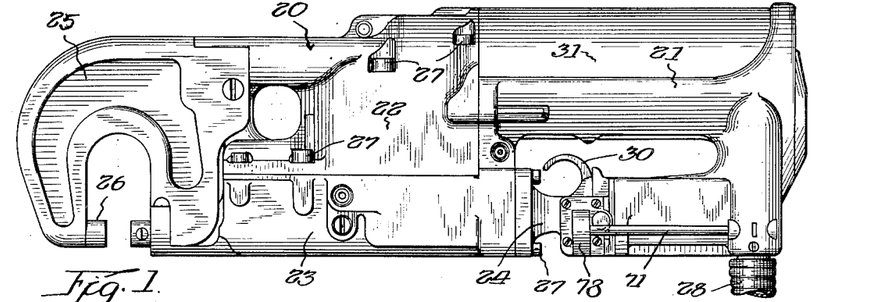
Figure 1 is a side elevational view showing the riveter of the invention embodied in portable form.

Referring to the drawings, the riveter selected for illustrating the present invention includes a housing comprising a plurality of sections which may be cast, forged or otherwise created from metal to have sufficient strength to withstand the pressures established within the housing. As best shown in Figure 1, the squeeze riveter generally designated by numeral 20 includes a pneumatic section 21, hydraulic sections 22 and 23, a trigger section 24, and the yoke 25 which provides the anvil 26. The various sections have interfitting relation with each other, being secured by bolts such as 27 so that the housing when assembled is substantially unitary with all the operating parts and with the hydraulic medium confined within the same. For operation it is only necessary to connect the riveter to a source of air under pressure as by means of hose 28 and a riveting operation can be performed in accordance with the actuation of trigger 30.

Figure 2:
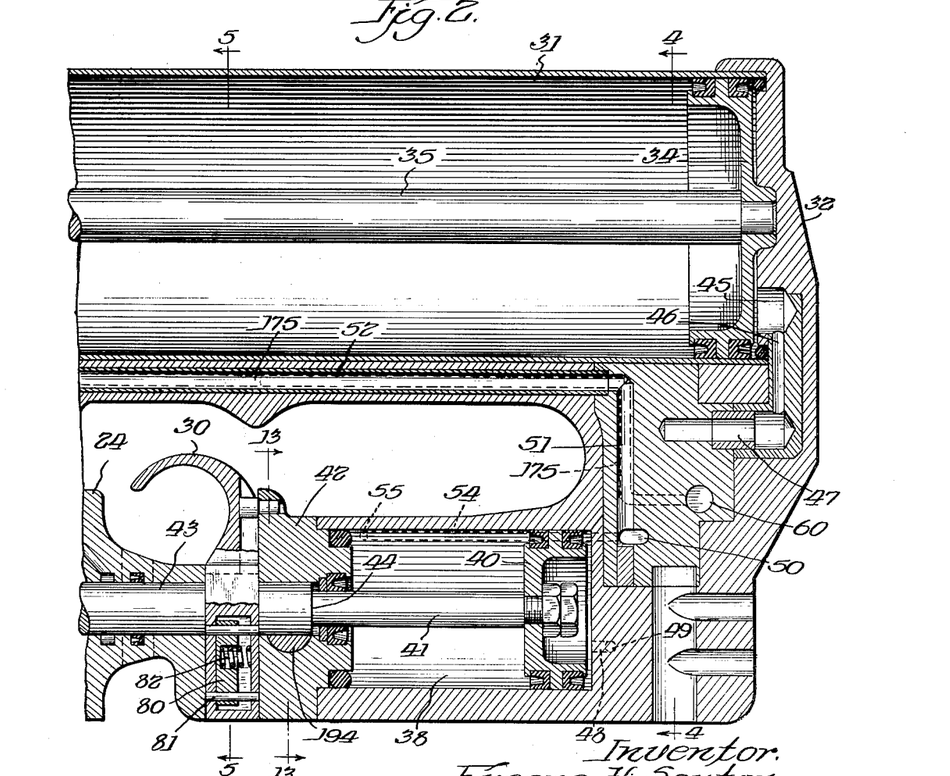
Figure 2 is a fragmentary sectional view taken longitudinally through the pneumatic end of the present riveter illustrating the auxiliary and main power cylinders and associated parts.
Figures 4, 10:
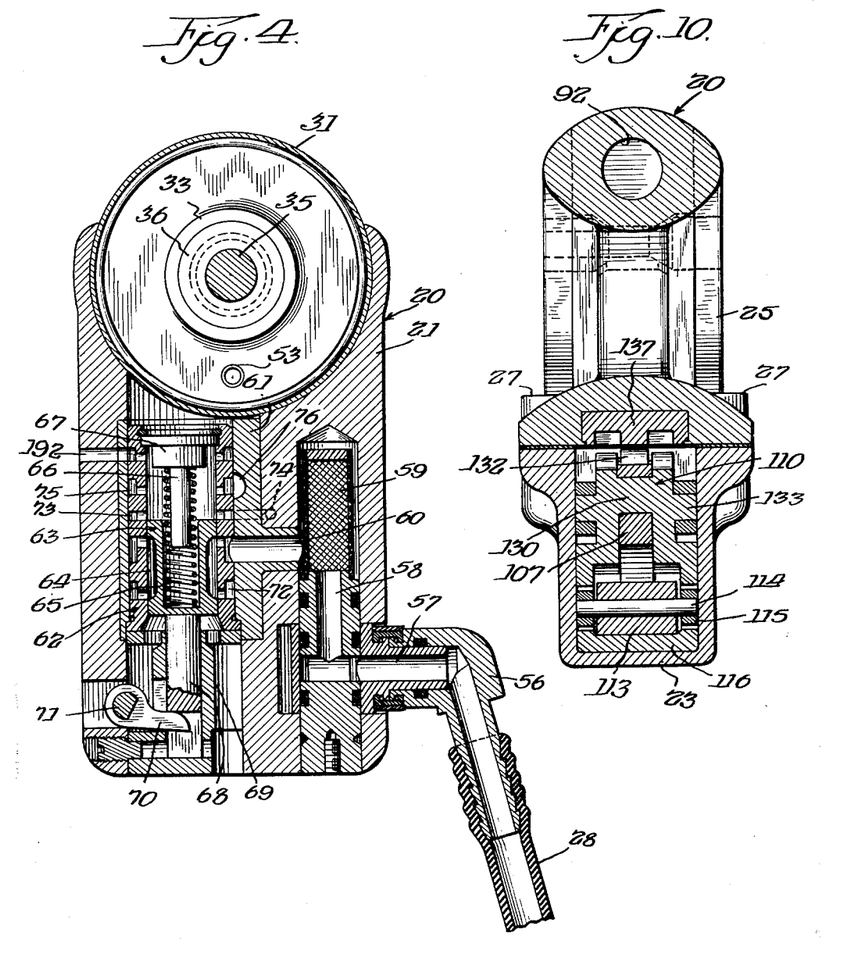
Figure 4 is a transverse sectional view taken substantially along line 4—4 of Figure 2, looking in the direction of the arrows.
Figure 10 is a transverse sectional view taken substantially along line 10—10 of Figure 3 and looking in the direction of the arrows.

The pneumatic section 21 and the trigger section 24 are shown in longitudinal cross section in Figure 2 and the transverse sectional view, Figure 4, illustrates the valve structure for controlling the air supply to the auxiliary power cylinder and to the main power cylinder, the same comprising the two major elements of the pneumatic section. The main power cylinder is formed by the cylindrical member 31 confined between the rear wall 32 of the pneumtic section 21 and the wall 33 of the hydraulic section 22. The piston 34 is adapted to reciprocate within the main power cylinder, being suitably secured to the right hand end, Figure 2, of the piston rod 35, which enters the bushing 36 located in wall 33, said bushing having sealing rings 37. Bushing 36 has passage 39 leading to the atmosphere through a wall of the housing for conducting air from cylinder 31 which may leak by the sealing ring 37 and for also conducting any oil leaking from the hydraulic compartment and exhausting the same to the atmosphere. The auxiliary power cylinder 38 is cored in section 21 and this cylinder receives the piston 40 suitably secured to the piston rod 41 at the right hand end thereof as shown in Figure 2. The opposite end of piston rod 41 enters the cap member 42 which closes this end of the cylinder 38. The diameter of piston rod 41 at a predetermined point is increased as indicated by section 43 and the trigger 30 is so located as to coact with the enlarged section 43 when the parts are in retracted position and to coact with the shoulder 44 and rod 41 during operation of the riveter in a manner and for purposes which will be more particularly pointed out as the description proceeds.

Figure 3:
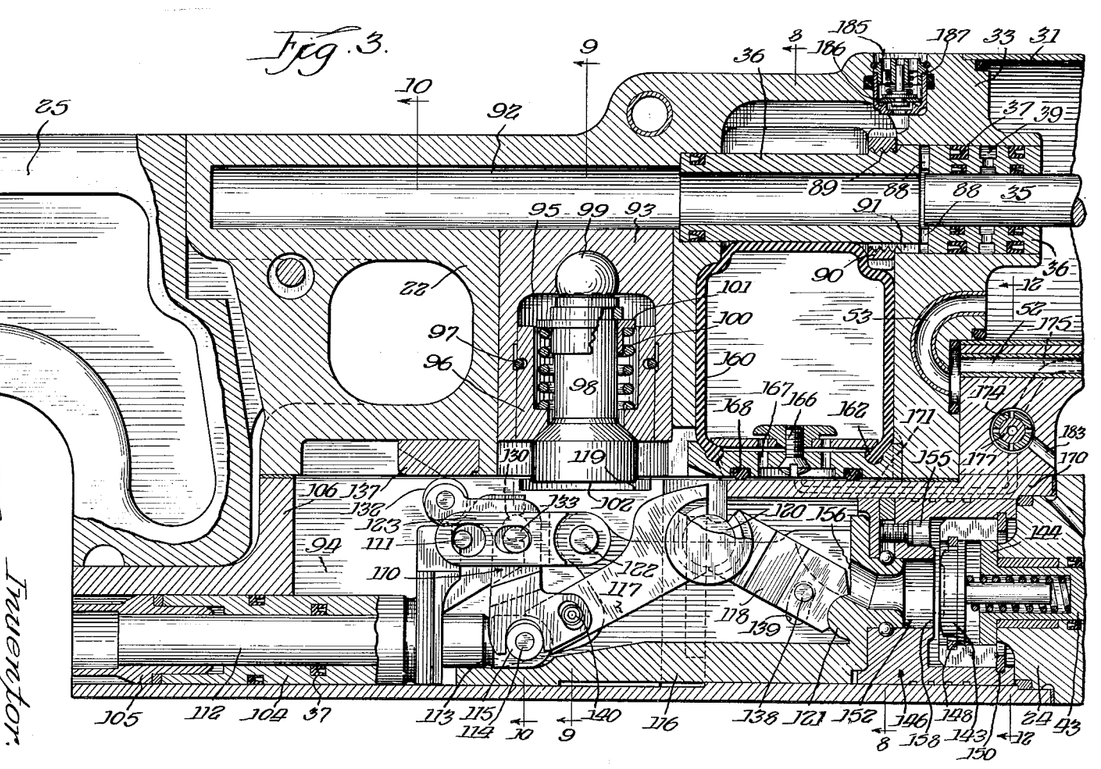
Figure 3 is a fragmentary sectional view taken longitudinally through the hydraulic end of the present riveter illustrating in addition to other features the various parts having operation for computing rivet size and for upsetting the rivet.

The wall 32 is provided with the port 45 communicating with the vertical passage 46 and the horizontal passage 47. At the proper time air under pressure is supplied to the passage 47 which flows upwardly and enters the main power cylinder through port 45 to drive the piston 34 in a forward direction to effect a working stroke of the hydraulic intensifying piston rod 35. In a similar manner port 48 is provided for admitting air under pressure to the right hand end of the auxiliary power cylinder 38 which functions to drive piston 40 in a forward direction, effecting a working stroke of the piston rod 43. The port 48 connects with the passage 49. For moving piston 34 to the right to return it to initial position the passage 50 is provided, having communication with the vertical passage 51 which in turn communicates with the tube 52 extending longitudinally in a direction parallel to the cylinder 31. At the left hand end of the tube as shown in Figure 3, the same communicates with the curved passage 53 which provides a port at the left hand end of cylinder 31. Air under pressure admitted to passage 50 will flow through passage 51, tube 52 and passage 53 to enter cylinder 31 at the left hand end, thereby effecting a return stroke of piston 34. Air from passage 50 is simultaneously admitted to passage 54 which terminates at 55 to provide a port for cylinder 38. Accordingly, air under pressure is also admitted to the left hand end of piston 40 to move the same to the right for returning said piston and piston rod 43 to initial position.

Referring to Figure 4, it will be seen that the riveter has connection by means of the fitting 56 with the air supply hose 28. The air upon being admitted to passage 57 flows upwardly through passage 58 to within the strainer 59. From here the air may enter the main supply passage 60 having a definite position vertically of the port member 61. The member is tubular for receiving the sleeve 62 which is held in fixed position within the port member and has a plurality of ports by means of which flow of the air under pressure from passage 60 is controlled. The valve 63 is adapted to reciprocate within sleeve 62 and said valve thereby controls the opening and closing of certain ports in the sleeve. For this purpose the valve is grooved centrally, having the shape of a spool and which thus results in the annular passage 64 between the spool and the sleeve. The valve 63 is cored for receiving the coil spring 65, having telescoping relation with the stem 66 and being confined between the valve 63 and the plug 67. The coil spring 65 tensions the valve in a downward direction, maintaining the same in contact with the lift pin 68 supported for vertical reciprocating movement by the sleeve 69. The lower end of the lift pin 68 is bifurcated for receiving the pawl 70 fixed to shaft 71 and adapted to be rocked upon rotation of the shaft.

With the valve 63 in position, as shown in Figure 4, the annular passage 64 provided by the valve connects the air supply passage 60 with chamber 72, which communicates with passage 50 so that air under pressure is supplied to the respective cylinders for retracting the pistons 34 and 40 and which maintains said pistons retracted as long as air is supplied to the riveter and the valve is held in its lowermost position as shown in Figure 4. The shaft 71 is actuated by movement of trigger 30 and assuming that the trigger is lifted to its first elevated position, Figure 6, the valve 63 will be elevated to connect the air supply passage 60 with chamber 73, the same communicating with passage 74 which in turn communicates with passage 49. This first actuation of the valve will therefore open chamber 72 to the atmosphere and admit air under pressure to the auxiliary power cylinder through port 48 to effect a working stroke of the piston, causing the same to move to the left, Figure 2. This movement of piston 40 continues through a working stroke which locates shoulder 44 in a definite position with respect to trigger 30 so that the trigger can now be actuated into its second elevated position. This working stroke of the piston 40 and piston rod 43 produces movement of the unit assembly in a forward direction to cause movement of the work engaging plunger into contact with the work and movement of the rivet-upsetting ram into contact with the rivet to be operated on. It is necessary that these operations be completed before actuation of the trigger into its second elevated position which is the reason for locating the shoulder 44 in a definite position with respect to the trigger at the end of the working stroke of piston 40.

Figure 7:
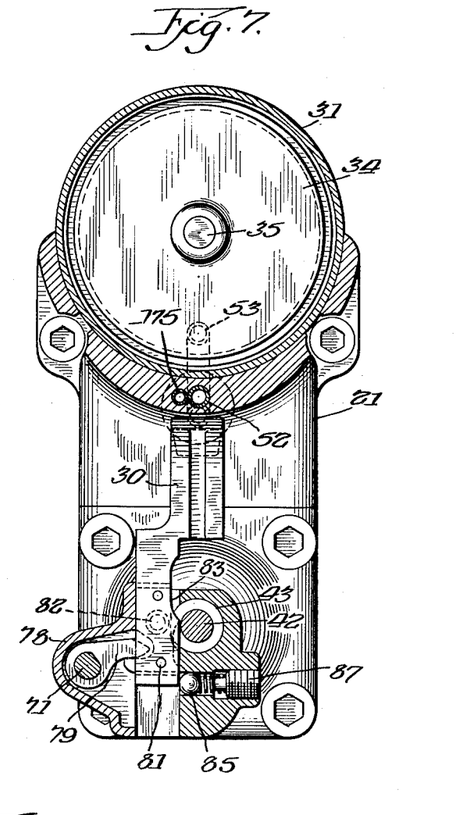
Figure 7 is a view similar to Figure 5 but showing the second elevated position of the trigger structure to cause operation of the main power cylinder.

Actuation of trigger 30 into its second position of movement, Figure 7, will elevate valve 63 so as to connect air supply passage 60 with the port 75 which communicates with the semicircular passage 76 connecting in turn with passage 47, Figure 2, whereby air under pressure is delivered to the main power cylinder through port 45, causing piston 34 to move to the left for a working stroke. The action of the piston 34 and plunger 35 will be more particularly explained as the description proceeds, it being only necessary at this time to state that the rod 35 functions to intensify the hydraulic pressure within the hydraulic compartment of the riveter, producing movement of an operating piston, which communicated through force multiplying means to the ram for upsetting the rivet.

Upon completion of the riveting operation the trigger can be released and the same is then forced downwardly by the coil spring 65 acting upon valve 63, plunger 68 and pawl 70 to move the trigger through connecting linkage. The valve will therefore come to rest in its lowest position, Figure 4, and the air supply passage 60 will again be connected to port 72 so that air is supplied to passage 50 and the various passages connecting therewith for retracting the pistons.

Figures 5, 11, 12:
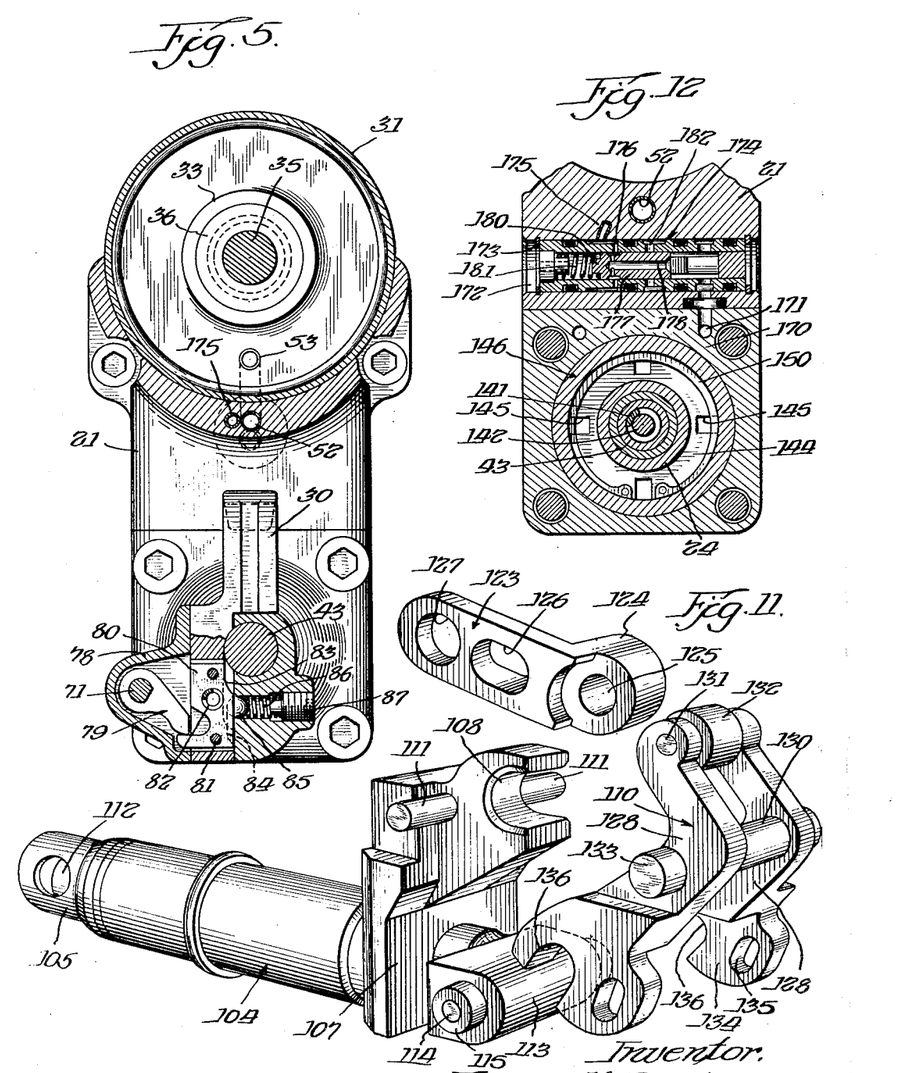
Figure 5 is a transverse sectional view illustrating details of the trigger structure taken substantially along line 5—5 of Figure 2 and looking in the direction of the arrows.
Figure 11 is an exploded view in perspective illustrating certain parts of the unit assembly which have coaction during the rivet size computing operation.
Figure 12 is a fragmentary transverse sectional view taken substantially along line 12—12 of Figure 3 and looking in the direction of the arrows.
Figure 6:
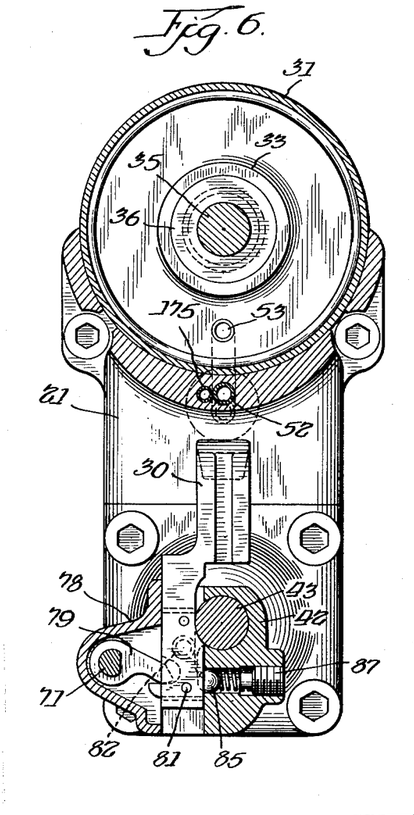
Figure 6 is a view similar to Figure 5 but showing the first elevated position of the trigger structure to cause operation of the auxiliary power cylinder.

As best shown in Figure 1, the shaft 71 is located exteriorly of the section 21 and extends longitudinally for operative connection with trigger 30. This trigger end of the shaft enters and is journalled by the trigger rod hanger 78 suitably secured to the trigger section 24. Within the hanger the rod 71 is provided with a pawl 79 adapted to coact with the lock member 80. The lock member comprises an insert carried by the trigger and which is provided with an opening for receiving the insert, as clearly evident in Figure 2. The lock member is suitably carried by pins 81 and is tensioned by coil spring 82 which maintains the lock member in contact with the left wall of the trigger. As best shown in Figures 5, 6 and 7, the lock member is provided with a shoulder 83 adapted to engage the periphery of the rod 43 when in retracted position to limit upward movement of the trigger to its first elevated position. It will be observed that the lock member is additionally provided with a recess 84 for the detent comprising the ball 85 tensioned by the spring 86, the set screw functioning as a plug to back up the spring. When the trigger has been actuated to its first elevated position shoulder 83 will engage piston rod 43 and the low terminal end of recess 84 will be in contact with ball 85. This position of the parts is shown in Figure 6.

As a result of shoulder 83 the trigger is held in its first elevated position until piston rod 43 has moved a predetermined stroke in a forward direction. Upon completion of this operation it will be understood that shoulder 44 will be located a distance beyond, that is, to the left, Figure 2, of the lock member 80 and accordingly the trigger is thereby released so that it may be actuated to its second elevated position as illustrated in Figure 7. The rod 71 will be rotated to oscillate pawl 79, thus elevating the lock member 80 and causing the spring pressed ball 85 to ride out of its recess 84 and to engage the bottom wall of the trigger. It will be observed that a portion of the lock member 80 is located in the path of shoulder 44, with some clearance existing between the parts. This relative positioning of the parts is somewhat critical since plunger 43 must complete its predetermined working stroke in a forward direction before the main power cylinder can be energized by actuation of the trigger into its second elevated position. During upsetting of the rivet, piston rod 43 will have slight movement in a rearward direction so that shoulder 44 may be caused to contact the lock member, which, however, is yieldingly carried by the trigger permitting this rearward movement of the piston rod to take place. If it were not for the resilient mounting of the lock member the trigger might be locked by piston rod 43 and the unit assembly including the work closer plunger and the ram would likewise be locked in operative position.

As has been previously explained, the plunger 35 is adapted to enter the bushing or sleeve 36 located in wall 33 of the hydraulic section 22. The sleeve is provided with hydraulically aligned passages 88 which are so positioned in the sleeve as to be in substantial alignment with the end of plunger 35 when the plunger is in retracted position. The exterior of the sleeve is also threaded at 89 for receiving the retaining collar 90. This threaded section of the sleeve is provided with a plurality of longitudinally extending passages 91 which communicate with the passages 88 so that with the plunger in retracted position the chambers in the hydraulic compartment above and below the operating piston are in communicating relation. As a result of a working stroke of the plunger 35 the same moves forwardly, that is, in a direction toward the left, Figure 3, to enter the hydraulic intensifying chamber 92 in the hydraulic section 22 of the housing. In this operation the plunger 35 functions as an hydraulic intensifying ram.

The operating piston 93 is mounted for movement in a wall of the section 22, being located between the hydraulic intensifying chamber 92 and the unit assembly chamber 94. The operating piston is cored centrally, with the opening being located in the bottom, to form the recess 95 which receives sleeve 96, the same being retained within the recess by ring 97. An intensifier foot 98, formed of relatively hard steel, is resiliently carried by the sleeve 96, the said foot having a spherical top 99 which has bearing in the top wall of the operating piston. The foot is resiliently held by sleeve 96 by the coil spring 100 encircling the shank of the intensifier foot and being confined between the sleeve and the collar 101 carried by the foot. The bottom of the intensifier foot 98 is provided with a flat surface 102 which is adapted to engage force multiplying means, as will be presently described, for moving the ram to upset the rivet.

The riveter of the invention is provided with a work closer plunger 104 which includes the tip 105 fitted thereto, said plunger and tip being mounted for reciprocating movement in the wall 106 of the hydraulic compartment 23. As best shown in Figure 11, the plunger 104 is provided with a head 107, the same having location within chamber 94 and being provided with the semi-circular socket 108 forming a fulcrum bearing for the correlating lever generally indicated by numeral 110. The head 107 of the plunger is also provided with pin 111 extending laterally on each side of the head adjacent the fulcrum bearing 108. The plunger 104 telescopically receives the rivet-upsetting ram 112 which is mounted by the plunger for reciprocating movement so that the plunger and ram may move as a unit or may move independently of each other. It will be observed that the ram extends through the plunger and into the work closer tip 105 of the same, and also that the ram projects rearwardly of the head 107 with the rearwardly projecting end having formed integral therewith the pivot block 113 carrying at its respective sides a pin 114 journalling the rollers 115. The plunger and ram are mounted with extremely close tolerances and sealing rings 37 are employed to prevent the leakage of oil from the compartment 94.

The work closer plunger and the rivet-upsetting ram are reciprocated by the carriage 116 mounted for reciprocating movement within chamber 94. The carriage is adapted to move in a direction parallel to that of the plunger and ram and is in substantial alignment with said parts.

The member 116 carries force multiplying means in the form of a toggle device including toggle arms 117 and 118 pivotally connected at 120. Arm 118 is anchored by the carriage since the right hand end of this arm engages bearing 121. Arm 117 has contact at its left end with pivot block 113. Accordingly, actuation of the force multiplying means to extend the toggle arms is applied to ram 112 to cause forward fovement of the ram, provided, of course, that carriage 116 is held stationary. The forward end of the carriage is pivotally connected by means of the pin 122 with a pair of links disposed on the respective sides of the correlation lever 110. Each link, designated by numeral 123, as best shown in Figure 11, includes a hub 124 which has an opening 125 for receiving pin 122. The link is also provided with a slot 126 and with a substantially circular opening 127.

The correlation lever 110 is interposed between the plunger and ram and the carriage, and said lever functions to articulately connect the carriage with the parts so that movement of the carriage is transmitted to said plunger and ram during forward and rearward travel of the carriage. The lever includes a pair of spaced members 128 substantially in the form of a crank, being connected at an intermediate point by shaft 130, which shaft is adapted to be received by the fulcrum bearing 108 on the head 107 of the plunger. The pin 131 provides journalling means for roller 132 located at this end of the correlation lever. The laterally extending pins 133 provide an intermediate axis for the correlation lever and which axis is in definite spaced relation with respect to the axis provided by shaft 130. The depending end portions 134 of the members 128 are slotted as at 135 and are also provided with a semi-circular recess 136. With the lever in proper assembled relation it will be seen that shaft 130 is received by the socket 108 and that the recesses 136 receive the rollers 115 so that the correlation lever pivotally connects with the ram on the axis 114. Said axis 114 is in definite spaced relation with axes 130 and 133. The links 123 are pivotally connected to carriage 116 by means of pin 122 and said links extend on opposite sides of the correlation lever, with the pins 133 of the lever located in slots 126 and with pins 111 located within the openings 127. The correlation lever 110 is maintained in retracted position as shown in Figure 3 as a result of the cam surface 137 with which the roller 132 engages. When the carriage 116, as a result of its forward travel, has moved the plunger in a forward direction to cause the plunger to contact the work, then the parts will be positioned so that the roller 132 is beyond its cam surface 137 and pivotal movement of the correlation lever can now take place to continue the forward movement of the ram, causing the same to contact the rivet.

Figure 3 shows the position of the carriage 116 in retracted position, in which position the plunger 104 and ram 112 are also retracted. As a result of a working stroke of the piston 43 the carriage 116 is caused to move forward and by this forward movement thrust is applied through the links 123 to the pins 133. The correlation lever is constructed and arranged so that this thrust is taken by shaft 130 and transmitted to the plunger, the shaft 130 being held in the fulcrum bearing 108 and through this connection of the parts the forward movement of the carriage is transmitted to the plunger. Said forward movement continues until the plunger contacts the work at which point in the forward travel of the carriage the bearing 121 is in definite spaced relation with the work being operated on. The extent of this forward travel of the plunger to contact the work varies according to the thickness of the work and it will be understood that when the plunger contacts the work the same is immobilized. Since the carriage has a certain position at this point in its forward travel the result of the operation is to compensate for grip thickness. Additional forward travel of the carriage is accordingly applied to the ram since the plunger is immobilized and only the ram can move. The thrust on the pins 133 will effect pivotal movement of the correlating lever, and with the shaft 130 in bearing 108 acting as a fulcrum, movement will be imparted to the axis 114 at a ratio with respect to movement of the carriage, depending on the characteristics of the correlating lever. As a result of this pivotal movement of the lever, the ram is moved forward into contact with the rivet. This additional forward travel of the carriage and movement of the ram into contact with the rivet functions to compute rivet size by gauging the length of the rivet. It will be understood that this forward movement of the ram is dependent on the length of the rivet, being less for large rivets and more for small rivets. The extent of this forward movement determines the extent of said additional travel of the carriage, that is, travel from the point at which the plunger becomes immobilized. Therefore this additional forward travel of the carriage moves the axis 121 forward for a distance inversely proportional to the length of the rivet and the axis 114 is also moved forward inversely proportionally to rivet length. The difference between the movements of these two axes will determine the amount to which the toggle device is extended and the mechanism therefore operates automatically to leave sufficient extension in the toggle so that upon subsequent actuation, the ram is moved the proper distance to upset the rivet and produce an upset head of the correct height.

Figure 9:
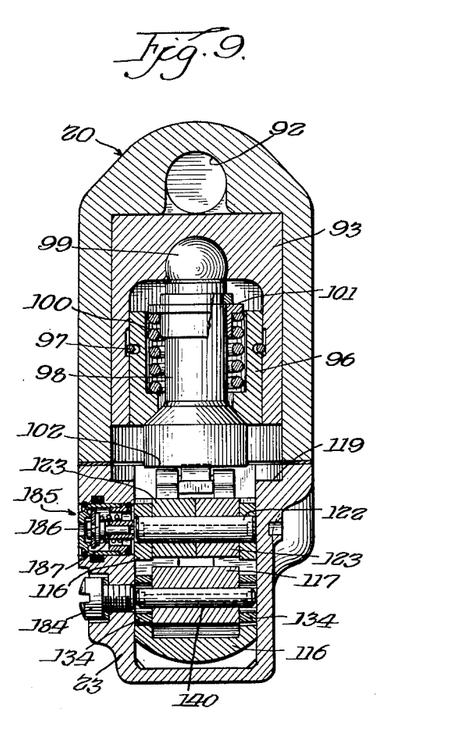
Figure 9 is a transverse sectional view taken substantially along line 9—9 of Figure 3 and looking in the direction of the arrows.

The movable carriage 116 carries the toggle device, one end of which is anchored by the carriage at 121 with the other end being operatively connected to the ram. The toggle device therefore moves with the carriage, and the parts are so constructed and arranged that the toggle device will be located under the intensifier foot 98 in substantial alignment therewith following the grip adjusting and rivet-size computing operations as described. Actuation of the operating piston 93 at this time will therefore result in actuation of the force multiplying means in the form of the toggle device to additionally move the ram in a forward direction for upsetting the rivet. The application of the hydraulically intensified force to the toggle device always drives the toggle device down to the same positive stop because the distance from the axis 121 to the front end of the ram must always be the same at the end of the upsetting operation, regardless of the size of the rivet driven. The stop for the toggle device is provided by shoulder 119, Figgure 9, which the operating piston 93 contacts to limit its movement in a downward direction. Therefore the mechanism, which has been generally termed the unit assembly, functions to condition the rivet-upsetting means in accordance with the thickness of the work and the length of the rivet projecting from the work, or, in other words, in accordance with the two variables of any riveting operation. As a result of these conditioning operations, which are executed by the plunger and the ram, the carriage is positioned at a point in its forward stroke and the toggle device is extended so that actuation of the device for upsetting the rivet will automatically result in the production of a head of the correct height and diameter according to predetermined standards.

Following the upsetting operation on the rivet the carriage 116 moves rearwardly to retract the plunger and the ram. Rearward travel of the carriage is transmitted directly to the plunger by means of the links 123 which connect with pins 111 extending laterally on the respective sides of the head 107 of the plunger. This rearward movement of the plunger carries with it the ram so that the parts move during this initial rearward travel substantially as a unit. When roller 132 contacts the cam 137 pivotal movement is imparted to the correlating lever 110 causing the lever to pivot in a counter-clockwise direction about shaft 130 as an axis, so that axis 114 is moved rearwardly additionally retracting the ram. Rearward movement of the carriage continues until the parts are positioned substantially as shown in Figure 3. The link 118 of the toggle device is retained within the carriage 116 by the pin 138 carried by said link and operating within elongated openings 139 in the side walls of the carriage. In a similar manner link 117 carries the pin 140 which projects laterally on opposite sides of the link, being received in elongated slots 135 in the arms of the correlating lever 110.

When the piston 93 is operated to produce downward movement of the intensifier foot 98 for actuating the force multiplying means, it is necessary to lock the carriage 116, preventing movement in a rearward direction. As a result of this locking of the carriage the entire extension of the toggle device is transmitted to the ram for rivet-upsetting purposes. In accordance with the invention the locking of the carriage takes place automatically at the end of the forward stroke of the carriage and prior to the actuation of the toggle device, being effected hydraulically by using the fluid medium within the compartment. Not only does locking of the carriage take place automatically for actuation of the force multiplying means, but the locking means of the invention has been constructed and arranged so that the lock is automatically released upon rearward travel being imparted to the carriage by piston rod 43. As will be brought out in the following description of this hydraulic locking structure the piston rod 43 controls operation of the lock since the same is rendered operative by the piston rod as a result of forward travel of the rod and is rendered inoperative as a result of rearward travel of the piston rod.

Figure 14:
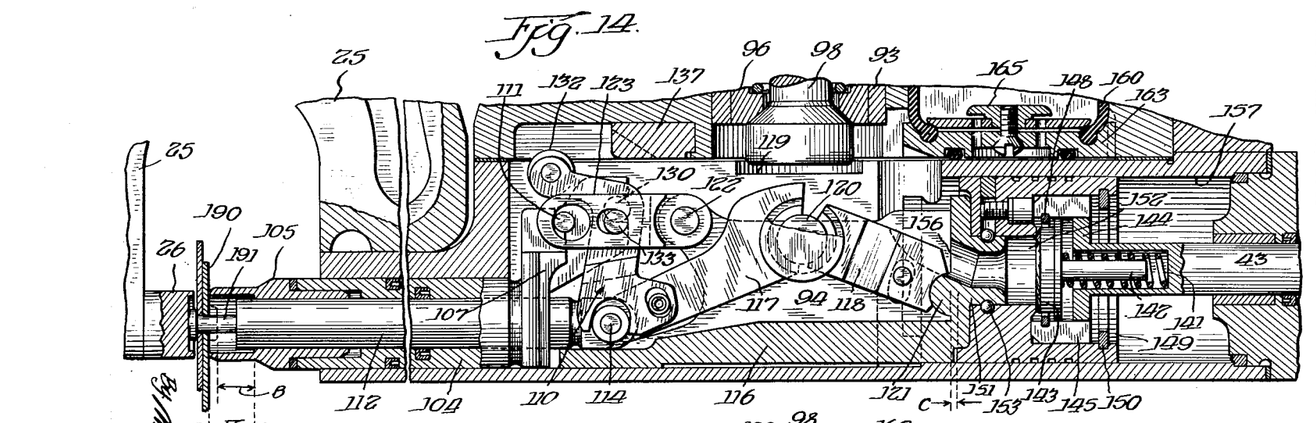
Figure 14 is a fragmentary sectional view illustrating the position of the unit assembly and associated parts following the steps in the complete cycle for computing the size of the rivet to be upset.
Figure 15:
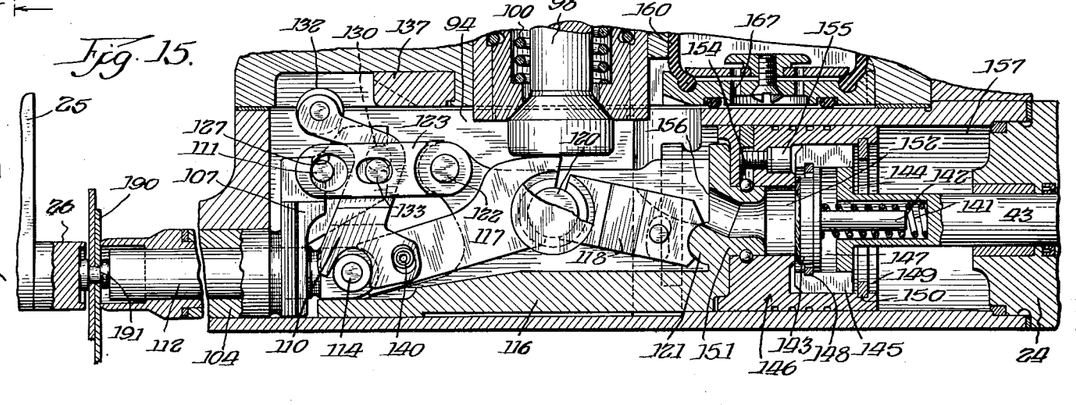
Figure 15 is a sectional view similar to Figure 14 but showing the position of the unit assembly and the associated force multiplying toggle device at the completion of an upsetting operation on the rivet.

The forward end of the piston rod 43 is recessed for receiving the coil spring 141 having telescoping relation with the stem 142 of the valve 143 so that the coil spring is confined between the valve 143 and the base of the recess. This end of the piston rod 43 is enlarged, forming the head 144, which is slotted at 145 to permit fluid to flow through the piston 146 within which the head 144 is mounted. As best shown in Figures 3, 14 and 15, the head 144 is recessed centrally, forming the chamber 147 within which is located valve 143. Said valve is retained within chamber 147 by the retaining ring 148 and it will be observed that the tension of the coil spring 141 on the valve is such as to normally hold the valve against retaining ring 148. The piston 146 is provided with a recess 149 in its rear surface which recess receives the head 144, the same being retained within the recess by the retaining ring 150. The parts are so constructed that the head 144 may move relative to the piston 146, said movement, however, being limited in one direction by the base of recess 149 in the piston and in the other direction by the retaining ring 150. Movement of the piston 146 is transmitted to the carriage 116 since the parts are fixedly connected, the rear extension 151 of the carriage being received in the passage 152 formed in the piston and which passage is disposed substantially centrally of the piston, having communication with the rear recess 149. The extension 151 and the walls of the passage are grooved for receiving the ball bearings 153 which function to securely join the piston and the carriage so that the two parts will move as a single unit. Connecting means in the form of ball bearings are employed since they can be easily removed, permitting disassembly of the parts. The bottom of recess 149 formed in the piston is provided with an opening communicating with groove 154 and in assembling the parts the ball bearings are inserted through this opening which is then closed by the threaded plug 155.

It will be observed that extension 151 of the carriage is provided with a central passage 156 communicating with passage 152 and which passages provide for flow of the fluid from compartment 94 through the piston into the rear of chamber 157, within which the piston is mounted for reciprocating movement. Chamber 157 communicates with the hydraulic compartment 94 and accordingly valve 143 is subjected to the pressure of the fluid within the compartment. As shown in Figure 3, the valve 143 is in retracted position since it is held in this position by plunger 43 which has been instrumental in retracting the carriage and associated parts. Initial forward movement of piston rod 43 will first of all move the head 144 with respect to the piston 146, taking up the clearance which has been provided between the parts. This forward movement of the head will cause the valve 143 to contact its valve seat 158 in surrounding relation with passage 152. The valve will be maintained in contact with said seat by coil spring 141 except when the pressure of the fluid in compartment 94 exceeds the resilient tension of the spring. This is the case during forward travel of the piston since the fluid within the compartment acts against valve 143, causing the same to open and allowing the fluid to flow through the piston into the rear of chamber 157. This opening action of the valve is facilitated by the low or zero pressure created to the rear of the piston. The fluid flows to the rear as long as forward travel of the piston continues and when the piston reaches the end of its forward stroke the valve 143 automatically closes since now the tension exerted by spring 141 on the rear of the valve is greater than the pressure exerted on the face of the valve. The closing of the valve 143 traps the fluid within chamber 157 behind the piston. Upon actuation of the toggle device the piston is prevented from moving rearwardly due to relative incompressibility of the fluid trapped in chamber 157. Actuation of the toggle device will apply a thrust to the piston in a rearward direction which develops an enormously high pressure on the fluid in chamber 157. This high pressure is applied to the rear of valve 143 and the valve is held closed. Actually the high pressure of the fluid in chamber 157 is also applied to piston rod 43, moving the same rearwardly, and which tends to release the valve. However, it will be understood that the piston rod 43 is urged forwardly by air pressure acting upon piston 49 so that the resulting pressure difference is such as to hold the valve closed. Since the diameter of passage 152 is greater than the diameter of the piston rod 43 the pressure difference on valve 143 is increased for holding the valve closed, although it would be possible to reduce the diameter of the passage to a size approximately equal to that of the piston rod and the automatic closing of the valve at the end of the forward stroke of the piston and hydraulic locking as described would still take place.

When the plunger rod 43 is again actuated in a rearward direction for retracting the carriage, the first action of the rod is to move head 144 with respect to piston 146 as permitted by the clearance between the parts. This rearward movement of the head moves the retaining ring 148 into contact with the rear flange on the valve 143 and the valve is moved out of contact with its seat 158. The passage is now open for the trapped liquid in chamber 157 to flow through the piston and return to compartment 94, which flow takes place as the piston is moved rearwardly by rearward travel of the piston rod 43. During this travel it will be seen that head 144 is operative to hold the valve open and the position which the parts assume at the end of their rearward travel is shown in Figure 3. Thus the piston rod 43 functions as an actuator rod, controlling opening and closing movements of valve 143. However, the operation of the valve in closing at the end of the forward stroke of the carriage is automatic and the locking of the carriage in said forward position is also automatic, being effected hydraulically so that the locked piston will remain substantially stationary during force multiplier actuation.

Figure 8:
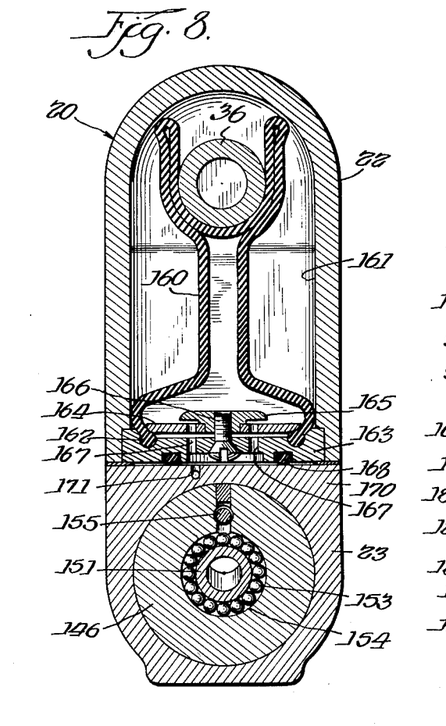
Figure 8 is a transverse sectional view taken substantially along line 8—8 of Figure 3 and illustrating the flexible hydraulic compensating means in partially collapsed condition.

The hydraulic compartment within the housing of the present tool includes the chambers 92 and 94, Figure 3, said chambers being separated by the operating piston 93. The chamber 92 comprises the hydraulic intensifying chamber and the pressure on the fluid within this chamber is materially increased by movement of the hydraulic intensifying ram 35 in a direction toward the left. This movement of the ram automatically closes the passageway 88, connecting the chambers, and thus the fluid is trapped in chamber 92 with the result that the intensified pressure is applied to the top of the operating piston 93, forcing the piston in a downward direction. As the operating piston 93 moves downwardly into the lower chamber 94 it displaces some of the fluid in said chamber and in order to maintain the fluid pressure in chamber 94 substantially uniform the invention provides compensating means in the form of a resilient container 160, Figure 8. The resilient container 160 is located within the chamber 161 and the upper portion of the same is disposed on the respective sides of the sleeve 36 which extends through said chamber. The container is open at its bottom end, the opening being defined by the bead 162 and which bead is retained in the base plate 163, being confined between the plate and the cover 164. The cover is held in secured relation to the base plate 163 by the nut 165 and by the securing screw 166 which is inserted through the base plate from the bottom thereof. This connection of the resilient compensating container to the base plate 163 provides an air-tight joint between the parts and provision is made for the entrance and exit of air to and from the resilient container by means of openings 167 which extend through the base plate and the top plate being located under the nut 165, which, however, is spaced so that the openings are at all times open.

The bottom surface of base plate 163 is provided with an annular groove for receiving the rubber sealing ring 168 located in surrounding relation with the openings 167 and which therefore functions to seal said openings against the entrance of fluid such as oil, since the ring 168 is in contact with wall 170 within which chamber 157 is located. It will be understood that chamber 161 is in communication with the hydraulic compartment of the tool and in effect constitutes part of said hydraulic compartment which, as explained, additionally includes the chambers 92, 94 and 157. The oil within chamber 161 is therefore in direct contact with the resilient walls of the compensating means and by maintaining air under pressure within the compensating means it is possible to maintain a pressure of predetermined magnitude on the oil within the hydraulic compartment. This is done by admitting air under pressure to the interior of the resilient compensating means following a rivet-upsetting operation, closing off said air supply when the pressure reaches a predetermined maximum, and then venting air from the compensating means to the atmosphere during a riveting operation so that the pressure on the oil within chamber 94 does not become excessive. The valve structure for accomplishing these operations will now be described.

The conduit 171 in wall 170, Figure 12, has an opening located directly under screw 166 and thus said opening communicates with the space sealed by the ring 168 so that air supplied by conduit 171 will enter the resilient compensating means through openings 167. The opposite end of conduit 171 communicates with the transverse bore 173 within which is located valve structure for controlling the admission of air under pressure to the compensating means and for venting the air to the atmosphere. The valve structure, retained within bore 172 by end retaining rings 173, essentially consists of a sleeve indicated in its entirety by numeral 174 and a tubular valve member 177. Air under pressure is supplied to the valve structure by the conduit 175 which extends within section 21, Figure 2, substantially parallel to the tube 52, said conduit 175 communicating at its right hand end with passage 69 to which air under pressure is supplied by the hose 28. The conduit 175, as best shown in Figure 12, connects with the port 176 provided in sleeve 174 and as a result of said port air is admitted to the interior of the sleeve. The tubular valve member 177 is adapted to reciprocate within the sleeve 174, the said member having a longitudinal bore 178 which is in communication with conduit 171. The valve member is tensioned by the coil spring 181 and said sleeve is additionally provided with port 182 which connects with the atmospheric vent 183 as shown in Figure 3.

It will be seen that the member 177 is subjected to the tension of the coil spring 181 which tends to move the member toward the right.

Said member is also subjected to the pressure of the air within conduit 171 and this air pressure acting on the member tends to move the same in a direction toward the left. When the parts are disposed in retracted position as shown in Figure 3 the compensating container 160 is maintained partially inflated by air under pressure from conduit 175. Assuming that the pressure on member 177 is such as to locate the same as shown in Figure 12, where port 176 is in alignment with the port in the valve member, air under pressure will be admitted to the bore 178 and to conduit 171 and thus to the resilient compensating container to build up the pressure within the container to a predetermined maximum, depending on the calibration of the valve structure shown in Figure 12. As the pressure within the resilient container increases the member 177 is moved in a direction toward the left against the tension of coil spring 181 and eventually the port 176 is cut off, thus terminating any further supply of air to the compensating means. The inflated condition of the resilient container 160 will maintain the desired pressure on the oil within the hydraulic compartment and this condition will exist as long as the parts remain in retracted position since any reduction in the air pressure within the compensating means will allow member 177 to move to the right whereupon port 176 will be uncovered to again build up the pressure to the predetermined maximum.

The compensating means additionally provides a storage chamber for surplus oil. With the resilient container 160 partially inflated it will be seen that surplus oil is stored within chamber 161. During operation over an extended period of time some of this oil may leak from the compartment. However, the resilient container 160 will maintain the desired pressure on the oil until the container becomes fully expanded, when no further expansion can take place, and refilling of the hydraulic compartment is then required.

As previously explained, downward travel of the operating piston 93 will displace some of the oil within chamber 94 and the pressure on the oil in this chamber will increase, resulting in compression of the resilient container 160. This action increases the pressure within the container and the valve member 177 is moved to the left to an extent where the port 182 is uncovered, allowing the air to vent to the atmosphere through vent 183. The pressure within the compensating means is reduced to a point where the desired pressure is maintained on the oil within chamber 94. Upon retraction of the parts, including the operating piston 93, the pressure on the oil within chamber 94 will drop and the same condition occurs with respect to the air within the resilient compensating container 160. The valve member 177 therefore moves to the right under tension of spring 181 and presently port 176 is uncovered, allowing air under pressure from conduit 175 to replenish the air within the compensating means, restoring the pressure within the same to the predetermined maximum.

Section 23 of the housing, as best shown in Figure 9, is provided with a pair of openings in order to facilitate the assembling of the toggle device and the connection of the carriage with the correlation lever. When the toggle device has been properly assembled in carriage 116 and with the ram 112, the correlation lever 110 and the links 123 in place, the pin 140 is then inserted through the lower opening in section 23 and into link 117 for connecting the same with the correlation lever. This opening in the section is then closed by the threaded plug 184. In a similar manner the pin 122 is inserted through the top opening to connect the carriage with the links and then this opening is closed by a fitting designated in its entirety by numeral 185. Said fitting functions as an oil inlet fitting since the same is provided with a valve member 186 resiliently held in contact with its seat by the coil spring 187. Oil under pressure can be forced through the fitting since the valve 186 is automatically depressed by the flow of oil under pressure in a direction inwardly against the valve. In this manner the hydraulic compartment within the tool is filled with oil as the first step in conditioning the tool for operation. As a precaution to prevent excessive oil pressure within the hydraulic compartment a second fitting 185 is located in section 22 of the housing, Figure 3, also communicating with the hydraulic compartment. This second fitting is reversed in position so as to provide for flow of oil in an outward direction. The coil spring 187 backs up the valve member 186 with sufficient tension so that the oil is sealed within the compartment. However, the calibration of the fitting is such that oil from said compartment can be discharged through the fitting should oil pressure develop in excess of the predetermined maximum.

The device of the invention provides a complete riveting tool which contains within the housing all the mechanism for upsetting a rivet, automatically producing a concentric head of specified height and diameter. It is only necessary to connect the riveting tool with the air hose 28 which supplies air under pressure at approximately one hundred pounds per square inch. The tool is first placed with respect to the work 190 and rivet 191, Figures 14 and 15, so that the anvil 26 backs up said work and also the rivet. With the tool in proper straddling relation with the rivet the trigger 30 is actuated to its first elevated position, which is determined by contact of the trigger with the enlarged diameter of piston rod 43.

As previously described, this action of the trigger produces movement of valve 63, admitting air to the right hand end of cylinder 38 which moves the piston forwardly in a direction toward the left. This action of the piston is communicated to piston rod 43 with the result that the head 144 is initially moved with respect to piston 146 to take up the clearance provided between the parts. This brings valve 143 into contact with its seat 158 and additional movement of the piston rod produces movement of piston 146 and also movement of carriage 116. This forward travel of the carriage is imparted to the plunger 104 and to the ram 112, which elements move forwardly as a unit until the plunger contacts the work. During this forward travel the oil within chamber 94 has automatically opened valve 143 thereby flowing into the rear of chamber 157.

When the plunger becomes immobilized the carriage 116 and the toggle device carried thereby is positioned at a point in its forward travel with respect to the work to compensate for the thickness of the work. This thickness of grip as it is often called constitutes one of the variables in any riveting operation. Additional forward travel of the carriage from the point where the plunger became immobilized is now transmitted to the ram 112 since only the ram can move and the correlation lever constitutes the connecting means by which movement of the carriage is transmitted to the ram in a definite ratio, depending on the characteristics of the correlation lever. In moving the ram forwardly to contact the rivet not only is the carriage moved forward a proportional amount but the toggle device is extended an amount depending on the length of the rivet. In effect the mechanism therefore gauges the length of the rivet, the second variable in the riveting operation, and sufficient extension is left in the toggle device so that upon actuation for upsetting the rivet, a head is produced on the rivet of the correct diameter and height according to the size of the rivet. When the ram contacts the rivet 191 the carriage comes to rest, Figure 14, and the auxiliary power means has then completed the preliminary operations consisting in positioning the carriage and the toggle device with respect to the work and in conditioning the toggle device according to the length of the rivet, all as described.

Forward movement of piston rod 43 for performing the above operations has located shoulder 44 slightly beyond the lock member 80 carried by the trigger and as a result the operator is able to move the trigger into its second elevated position. The second elevated position of the trigger produces movement of the valve 63 to admit air to the right end of cylinder 31, causing movement of piston 34 to the left and operation of the hydraulic intensifying ram 35. The pressure of the oil within the chamber 92 is intensified and this intensified pressure is applied to operating piston 93, causing a full downward stroke of the piston into contact with stop shoulder 119. As shown in Figure 14, the carriage 116 and the toggle device has been so positioned as to be located directly under the intensifier foot 98 of the operating piston 93. The downward working stroke of the operating piston is applied to the toggle device, producing an extension of the toggle device to the limit as permitted by stop 119. The ram is thus moved forwardly to upset the rivet. The rearward thrust of the toggle device on piston 146 will intensify the pressure on the oil in the rear of the chamber 157 since this oil is trapped by the automatic closing of the valve 143 at the end of the forward stroke of the carriage. The intensified oil pressure acts on the valve 143 to maintain it closed so that the piston 146 is locked hydraulically, preventing movement of the carriage 116 in a rearward direction during the rivet-upsetting operation.

With the completion of the riveting operation the operator releases the trigger which descends to its original position as a result of tension exerted by coil spring 65. The valve 63 is again located in initial position, as shown in Figure 4, which opens the right hand end of the cylinders to the atmosphere through the vent 192 and connects the left hand end of the cylinders with the supply of air under pressure so that pistons 34 and 40 are returned to initial position, effecting retraction of plunger 35 and piston rod 43. Initial movement in a rearward direction of piston rod 43 will first of all move head 144 with respect to piston 146 to take up the clearance between the parts. This is sufficient to withdraw valve 143, opening the passage in the piston and thus allowing the piston and carriage together with the plunger and ram to be retracted. Rearward movement of the carriage will bring roller 132 into contact with cam surface 137 so that the correlation lever is rotated to retract the ram to its full extent which functions to reset the toggle device for another riveting operation.

Figure 13:
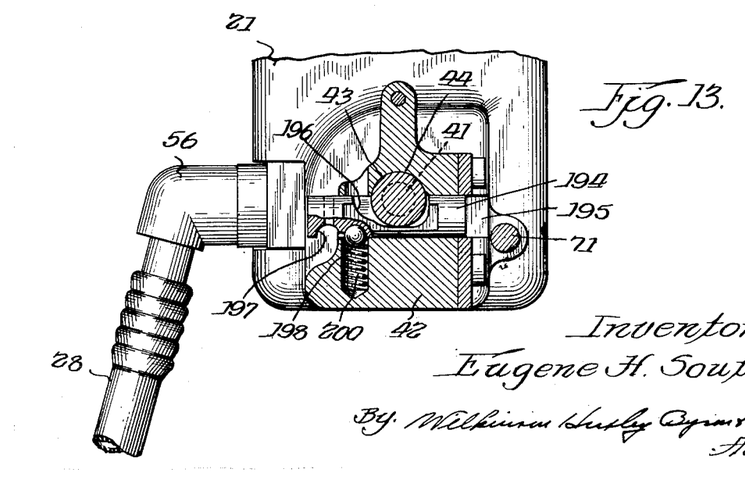
Figure 13 is a sectional view taken substantially along line 13—13 of Figure 2 showing details of the structure for limiting retraction of the auxiliary power cylinder following a riveting operation.

For some riveting operations it is not desired that piston 40 be retracted to its full extent. The invention accordingly provides means that may be set by the operator for limiting retraction of piston rod 43 to a partial extent or for permitting full retraction as the case may be. This structure is shown in Figure 13 and essentially consists of a slide 194 mounted for movement within bore 195 provided in the cap member 42. The slide 194 is cut away centrally to provide a stop shoulder 196 and the undersurface of the slide is provided with a plurality of recesses 197. Said recesses coact with the ball 198 tensioned by the coil spring 200 forming detent means for holding the slide in adjusted position. With the slide as shown in Figure 13, wherein it is inoperatively located in left hand position, the stop shoulder 196 is located out of the path of shoulder 44 on the piston rod 43 so that the piston rod is able to move rearwardly to its full extent for a full retraction of the unit assembly. When the slide 194 is moved into its operative right hand position the stop shoulder 196 is located in the path of shoulder 44 and rearward movement of piston rod 43 is thus limited so that only a partial retraction of the unit assembly will take place.

Figure 16:
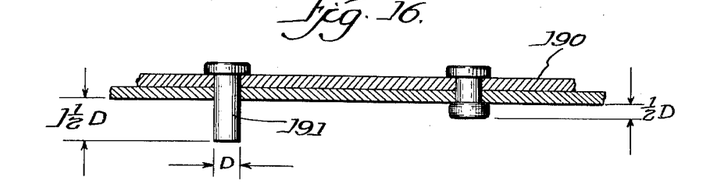
Figure 16 is a sectional view showing plates in riveted relation to illustrate the dimensions of the rivet before and after the formation of the upset head.

In analyzing the structure of the unit assembly which correlates the kinematic actions so as to compute rivet size, reference is made to Figure 14 wherein the distance from the end of the ram to the end of the sheet closer plunger, when the ram is fully retracted with relation to the plunger, is indicated by E, wherein B indicates the maximum stroke of the toggle device, and wherein C indicates the additional forward travel of the carriage, that is, travel of the carriage after the plunger becomes immobilized and which travel results in forward movement of the ram to contact the rivet. Figure 16 illustrates the desired proportions required by certain standard specifications between the shank diameter of a rivet, its protrusion length and its upset-rivet head. In accordance with said specifications a rivet should project from the surface of the work 1½ shank diameters and this protrusion should be upset to the extent of 1 shank diameter. It will therefore be observed that the standard specifications require the rivets be upset ⅔ of their protrusion and without taking into account deflection, which may be termed the total elastic change in the operating parts, then B equals ⅔ of E.

Eliminating from the discussion the elastic change in the operating parts and the design resulting therefrom and considering only the theoretical, the ⅔ ratio must remain effective during the rivet-size computing operations regardless of the position of the ram with relation to the end of the plunger. This requires that the correlation lever have a pivot ratio wherein the distance between the center of shaft 130 and the center of pins 133 is ⅓ the total distance from the center of shaft 130 to the axis 114. Since shaft 130 functions as the fulcrum it will be understood that movement of axis 114 will be three times that of the intermediate axis comprising the pins 133. Accordingly, the pivot ratio of the correlation lever determines the extent of movement of the carriage that occurs during movement of the ram in a forward direction to contact the rivet. As regards the theoretical structure under discussion, the rear toggle bearing 121 will therefore move ⅓ the distance the front toggle bearing 114 is permitted to move for contacting the rivet. And, since E is three times maximum C, the rear toggle bearing will be necessarily so located that when the toggle is extended for upsetting the rivet ⅓ of the protrusion length of the rivet will be left by the ram for rivet height. This can best be understood by observing that the rear toggle bearing 121 is moved forward ⅓ the distance that the ram travels to contact the rivet, or, in other words, ⅓ the distance that the front toggle bearing 114 travels during the rivet-size computing operation, and thus the total toggle stroke is therefore reduced ⅔ of whatever distance the ram had to move to contact the rivet. Inasmuch as the toggle stroke was established for this theoretical discussion as ⅔ of E it is obvious that this ratio will be maintained so that any rivet will be upset ⅔ of the distance it protrudes from the surface of the work.

For actual operating conditions it is necessary to revise the design of the operating parts since the enormous pressure developed during the upsetting operation produces deflection of the yoke, in addition to elongation of those members in tension, and compression of those members under pressure such as the hydraulic fluid within the locked cylinder to the rear of piston 146. One revision in design requires that the total elastic change in the operating parts be calculated for the largest rivets to be operated on and that this figure, which represents total deflection, be used as the amount by which the stroke of the toggle is increased over its theoretical stroke. Another revision in design requires that the pivot ratio of the correlation lever be changed so that the ratio of ram travel to carriage travel during the rivet size computing operation will be increased an amount sufficient to provide progressively increasing spacing between the rear toggle bearing 121 and the pivot 114 for using up that part of the increased toggle stroke which is not required in upsetting rivets of smaller sizes in which operations deflection approaches the minimum due to lower pressure requirements. Therefore the change in the pivot ratio is such as to increase the spread or spacing between the front and rear toggle bearings which takes place progressively during ram and carriage travel. In the embodiment of the invention as shown in the drawings the distance from the center of shaft 130 to the intermediate axis comprising pins 133 is approximately ⅑ of the total distance from the center of shaft 130 to axis 114 and accordingly movement of the ram will be nine times that of the carriage.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a riveting tool, a housing having a compartment, hydraulic pressure intensifying means including a movable piston having a pressure applying foot within the compartment, a unitary sub-frame also within the compartment and mounted for reciprocating movement in a direction normal to the direction of movement of the piston and in a direction to and from a riveting position, said sub-frame mounting force multiplying means including a foot engaging actuator having predetermined movement, a movable work-engaging plunger having one end exteriorly located and adapted to contact the work and having its opposite end movably mounted within the compartment, a rivet upsetting ram carried by the plunger for independent movement and also having one end thereof within the compartment, said force multiplying means being anchored at one end to the sub-frame and having its other end in pivotal association with said end of the ram, fluid means for reciprocating the sub-frame in a forward and rearward direction toward and from the work, means associated with the plunger, ram and sub-frame whereby movement of said sub-frame in a forward direction moves the plunger into contact with the work, and the stopping of the plunger by the work and the continued movement of the sub-frame reacts to move the ram relative to the sub-frame into contact with the rivet to be operated on, thereby stopping further movement of the sub-frame and positioning the actuator of the force multiplying means in operative position to be engaged by the foot of the hydraulic pressure intensifying piston, the relative movement of the ram and sub-frame reacting on said force multiplying means to utilize part of said predetermined movement, depending on the projecting length of the rivet, and other fluid means for effecting operation of the hydraulic pressure intensifying means to cause its foot to engage the actuator of the force multiplying means to cause the remainder of said predetermined movement to effect an additional forward movement of the ram for upsetting the rivet.

2. In a riveting tool, a housing having a compartment, hydraulic pressure intensifying means including a movable piston having a pressure applying foot within the compartment, a unitary sub-frame also within the compartment and mounted for reciprocating movement in a direction normal to the direction of movement of the piston and in a direction to and from a riveting position, said sub-frame mounting force multiplying means including a foot engaging actuator adapted to have predetermined movement, a tubular work-engaging plunger mounted for movement in a wall of the housing and having one end located exteriorly for contact with the work and having its other end within the compartment, a rivet upsetting ram telescopically carried by the tubular plunger and also having one end within the compartment, said force multiplying means being anchored at one end to the sub-frame and having its other end in pivotal association with said end of the ram, fluid means for reciprocating the sub-frame in a forward and rearward direction toward and from the work, means articulatedly connecting the sub-frame with the end of the plunger within the compartment, and other means associated with said sub-frame, the plunger and the ram whereby forward movement of the sub-frame moves the plunger into contact with the work, and stopping of the plunger by the work and the continued movement of the sub-frame reacts through said other means to move the ram relative to the sub-frame into contact with the rivet to be operated on, thereby stopping further movement of the sub-frame and positioning the actuator of the force multiplying means in operative position to be engaged by the foot of the hydraulic pressure intensifying piston, the relative movement of the ram and sub-frame reacting on said force multiplying means to utilize part of said predetermined movement, depending on the projecting length of the rivet, and other fluid means for effecting operation of the hydraulic pressure intensifying means to cause its foot to engage the actuator of the force multiplying means to cause the remainder of said predetermined movement to effect an additional movement of the ram for upsetting the rivet.

3. A riveting tool as defined by claim 2, wherein the means articulatedly connecting the sub-frame with the end of the plunger includes linkage which is operative upon rearward travel of the sub-frame to retract the plunger, and wherein the said other means which has association with said linkage, the plunger and the ram comprises a correlating lever having an intermediate pivot axis which mounts the lever on the linkage, said lever having a fulcrum bearing on the end of the plunger in the compartment, and said lever at its opposite end having pivotal connection with the end of the ram within the compartment.

4. In a riveting tool of the portable type, a housing having a compartment, hydraulic pressure intensifying means including a movable piston having a pressure applying foot within the compartment, a unitary sub-frame also within the compartment and adapted to reciprocate normal to the direction of movement of the piston and in a direction to and from a riveting position, said sub-frame mounting force multiplying means including a foot engaging actuator adapted to have predetermined movement, a tubular work-engaging plunger mounted for movement in a wall of the housing and having one end located exteriorly for contact with the work and having its other end within the compartment, a rivet upsetting ram telescopically carried by the tubular plunger and also having one end within the compartment, said force multiplying means being anchored at one end to the sub-frame and having its other end in pivotal association with said end of the ram, fluid means for reciprocating the sub-frame in a forward and rearward direction toward and from the work, a pair of links articulatedly connecting the sub-frame with the end of the plunger in the compartment and operative to retract the plunger upon rearward travel of the sub-frame, a correlating lever having a laterally projecting pin on each side forming an intermediate pivot axis, a slot in each of said links for receiving the pins to pivotally mount the lever, said lever having a fulcrum bearing on the end of the plunger within the compartment, and said lever at its opposite end having pivotal connection with the ram on the same pivot axis as the force multiplying means, whereby movement of the sub-frame in a forward direction moves the plunger into contact with the work, and the stopping of the plunger by the work and the continued movement of the sub-frame reacts through the correlating lever to move the ram relative to the sub-frame into contact with the rivet to be operated on, thereby stopping further movement of the sub-frame and positioning the actuator of the force multiplying means in operative position to be engaged by the foot of the hydraulic intensifying piston, the relative movement of the ram and sub-frame reacting on the force multiplying means to utilize part of said predetermined movement, other fluid means for effecting operation of the hydraulic pressure intensifying means to cause its foot to engage the actuator of the force multiplying means to cause the remainder of said predetermined movement to effect an additional movement of the ram for upsetting the rivet, and a cam surface provided by a wall of the compartment for contact with the correlating lever upon rearward travel of the sub-frame to effect pivotal movement of the lever for retracting the ram.

5. A riveting tool of the portable type, a housing having a compartment, hydraulic pressure intensifying means including a movable member having a pressure applying foot within the compartment, a unitary sub-frame also within the compartment and mounted for reciprocating movement normal to the direction of movement of the member and in a direction to and from a riveting position, said sub-frame mounting force multiplying means including a foot engaging actuator having predetermined movement, a tubular work-engaging plunger movably mounted by a wall of the housing and having one end exteriorly located and adapted to contact the work and having its opposite end located within the compartment, a rivet upsetting ram telescopically carried by the plunger for independent movement and also having one end thereof within the compartment, said force multiplying means being anchored at one end to the sub-frame and having its other end in pivotal association with said end of the ram, auxiliary power means for reciprocating the sub-frame in a forward and rearward direction toward and from the work, means associated with the plunger, ram and sub-frame whereby movement of the sub-frame in a forward direction moves the plunger into contact with the work, and the stopping of the plunger by the work and the continued movement of the sub-frame reacts to move the ram relative to the sub-frame into contact with the rivet to be operated on, thereby stopping further movement of the sub-frame and positioning the actuator of the force multiplying means in operative position to be engaged by the foot of the hydraulic pressure intensifying member, the relative movement of the ram and sub-frame reacting on said force multiplying means to utilize part of said predetermined movement, depending on the projecting length of the rivet, hydraulic locking means operating automatically to lock the sub-frame in position at the end of its forward movement preventing movement in a rearward direction, and main power means for effecting operation of the hydraulic pressure intensifying means to cause its foot to engage the actuator of the force multiplying means to cause the remainder of said predetermined movement to effect an additional forward movement of the ram for upsetting the rivet.

6. A riveting tool of the portable type, a housing having a compartment, hydraulic pressure intensifying means including a movable member having a pressure applying foot within the compartment, a unitary sub-frame also within the compartment and mounted for reciprocating movement normal to the direction of movement of the member and in a direction to and from a riveting position, said sub-frame mounting force multiplying means including a foot engaging actuator having predetermined movement, a tubular work-engaging plunger movably mounted by a wall of the housing and having one end exteriorly located and adapted to contact the work and having its opposite end located within the compartment, a rivet upsetting ram telescopically carried by the plunger for independent movement and also having one end thereof within the compartment, said force multiplying means being anchored at one end to the sub-frame and having its other end in pivotal association with said end of the ram, auxiliary means for reciprocating the sub-frame including a piston movable within a chamber communicating with the compartment, said piston having a passage so that fluid from the compartment will flow, due to a pressure differential, through the piston into the rear of the chamber as the piston moves forwardly and will reverse its direction of flow upon rearward movement of the piston, other means operatively associated with the plunger, ram and sub-frame whereby movement of said sub-frame in a forward direction moves the plunger into contact with the work, and stopping of the plunger by the work and continued movement of the sub-frame reacts to move the ram relative to the sub-frame into contact with the rivet to be operated on, thereby stopping further movement of the sub-frame and positioning the actuator of the force multiplying means in operative position to be engaged by the foot of the hydraulic pressure intensifying member, the relative movement of the ram and sub-frame reacting on said force multiplying means to utilize part of said predetermined movement, depending on the projecting length of the rivet, locking means for automatically closing the passage in the piston at the end of its forward movement to lock the piston and the sub-frame preventing rearward movement, and main power means for effecting operation of the hydraulic pressure intensifying means to cause its foot to engage the actuator of the force multiplying means to cause the remainder of said predetermined movement to effect an additional forward movement of the ram for upsetting the rivet.

7. A riveting tool of the portable type as defined by claim 6, additionally including an actuator rod for moving the piston and having connection with the piston permitting relative movement of the parts, and a valve member in the piston for opening and closing said passage, said actuator rod positioning the valve member to permit closing of the passage at the completion of the forward travel of the piston and said actuator rod positioning the valve member to maintain the passage open during rearward travel of the piston.

8. In a riveting tool of the portable type, a housing having a sealed compartment containing a fluid, an operating piston within said compartment positioned to divide the compartment into a first and a second chamber communicating with opposite ends of the piston respectively, a unitary sub-frame within the second chamber and mounted for reciprocating movement in a direction normal to the movement of the piston and in a direction to and from a riveting position, said sub-frame mounting force multiplying means including a foot engaging actuator having predetermined movement, a tubular work-engaging plunger movably mounted in a wall of the housing and having one end exteriorly located and adapted to contact the work and having its opposite end located within the second chamber, a rivet upsetting ram telescopically carried by the plunger for independent movement and also having one end thereof within the second chamber, said force multiplying means being anchored at one end of the sub-frame and having its other end in pivotal association with said end of the ram, auxiliary power means for reciprocating the sub-frame in a forward and rearward direction toward and from the work, means associated with the plunger, ram and sub-frame whereby movement of said sub-frame in a forward direction moves the plunger into contact with the work, and the stopping of the plunger by the work and the continued movement of the sub-frame reacts to move the ram relative to the sub-frame into contact with the rivet to be operated on, thereby stopping further movement of the sub-frame and positioning of the actuator of the force multiplying means in operative position to be engaged by one end of the operating piston, the relative movement of the ram and sub-frame reacting on said force multiplying means to utilize part of said predetermined movement, depending on the projecting length of the rivet, main power means for intensifying the hydraulic pressure in the first chamber to effect a working stroke of the operating piston and actuation of the force multiplying means to cause the remainder of said predetermined movement to effect an additional forward movement of the ram for upsetting the rivet, and compensating means for said second chamber including a collapsible member having contracting and expanding movement whereby to compensate for the fluid displaced by the working stroke of the operating piston.

9. In a riveting tool of the portable type as defined by claim 8 additionally including a source of air under pressure having connection with the interior of said collapsible member, and valve means interposed in the connection for maintaining the collapsible member inflated to a predetermined pressure, said valve means releasing air when the pressure in the collapsible member exceeds the predetermined pressure and admitting air when the collapsible member is inflated to a pressure below the predetermined pressure.

10. In a riveting tool of the portable type, a housing having a sealed compartment containing a fluid, an operating piston within said compartment positioned to divide the compartment into a first and a second chamber communicating with opposite ends of the piston respectively, a unitary sub-frame within the second chamber and mounted for reciprocating movement in a direction normal to the movement of the piston and in a direction to and from a riveting position, said sub-frame mounting force multiplying means including a foot engaging actuator having predetermined movement, a tubular work-engaging plunger movably mounted in a wall of the housing and having one end exteriorly located and adapted to contact the work and having its opposite end located within the second chamber, a rivet upsetting ram telescopically carried by the plunger for independent movement and also having one end thereof within the second chamber, said force multiplying means being anchored at one end of the sub-frame and having its other end in pivotal association with said end of the ram, auxiliary power means for reciprocating the sub-frame in a forward and rearward direction toward and from the work, means associated with the plunger, ram and sub-frame whereby movement of said sub-frame in a forward direction moves the plunger into contact with the work, and the stopping of the plunger by the work and the continued movement of the sub-frame reacts to move the ram relative to the sub-frame into contact with the rivet to be operated on, thereby stopping further movement of the sub-frame and positioning of the actuator of the force multiplying means in operative position to be engaged by one end of the operating piston, the relative movement of the ram and sub-frame reacting on said force multiplying means to utilize part of said predetermined movement, depending on the projecting length of the rivet, main power means for intensifying the hydraulic pressure in the first chamber to effect a working stroke of the operating piston and actuation of the force multiplying means to cause the remainder of said predetermined movement to effect an additional forward movement of the ram for upsetting the rivet, and a trigger associated with the auxiliary power means and having a first position for effecting operation of the auxiliary power means and a second position for effecting operation of the main power means, said trigger being movable to its second position only after the auxiliary power means has moved the sub-frame to a predetermined point in its forward travel.

11. In a riveting tool, a housing having a compartment, a unitary sub-frame within the compartment and mounted for reciprocating movement in a direction to and from a riveting position, a tubular work-engaging plunger movably mounted by a wall of the housing and having one end exteriorly located and adapted to contact the work and having its opposite end located within the compartment, a rivet upsetting ram telescopically carried by the plunger for independent movement and also having one end thereof within the compartment, force multiplying means carried by the sub-frame, said force multiplying means including a pair of articulated members adapted to have predetermined movement from collapsed to extended position, said members being anchored at one end to the sub-frame and having their opposite end in pivotal association with said end of the ram, connections associated with the plunger, ram and sub-frame whereby movement of the sub-frame in its forward direction moves the plunger into contact with the work, and the stopping of the plunger by the work and the continued forward movement of the sub-frame reacts to move the ram relative to the sub-frame into contact with the rivet to be operated on, thereby stopping further movement of the sub-frame and positioning the force multiplying means in operative position, the relative movement of the ram and sub-frame reacting on the force multiplying means to utilize part of said predetermined movement, depending on the projecting length of the rivet, locking means for locking the sub-frame in position at the end of its forward movement, and other means for actuating the force multiplying means into extended position, whereby to cause the remainder of said predetermined movement to effect an additional forward movement of the ram for upsetting the rivet.

12. A riveting tool as defined by claim 11, wherein the said connections include a correlating lever having a fulcrum bearing on the end of the plunger within the compartment and having pivotal association with said end of the ram, and wherein said forward movement of the sub-frame after the plunger has contacted the work is applied through the lever to the ram in a predetermined ratio of sub-frame movement to ram movement depending on the pivot characteristics of the lever.

EUGENE H. SOUTER.

References Cited in the file of this patent

UNITED STATES PATENTS

| Number | Name | Date |
|---|---|---|
| 748,816 | Terry | Jan. 5, 1904 |
| 832,294 | Caskey | Oct. 2, 1906 |
| 833,441 | Caskey | Oct. 16, 1906 |
| 836,301 | Caskey | Nov. 20, 1906 |
| 2,388,877 | Souter | Nov. 13, 1945 |
| 2,397,796 | Lippincott | Apr. 2, 1946 |
| 2,446,358 | Yates | Aug. 3, 1948 |

FOREIGN PATENTS

| Number | Country | Date |
|---|---|---|
| 165,461 | Germany | Dec. 6, 1905 |
| 345,727 | Germany | Dec. 16, 1921 |
| 375,004 | Italy | Sept. 19, 1939 |